Patented July 1, 1924.

1,500,076

UNITED STATES PATENT OFFICE.

WALTER E. HOLLAND, OF PHILADELPHIA, PENNSYLVANIA, ASSIGNOR TO PHILADELPHIA STORAGE BATTERY COMPANY. OF PHILADELPHIA, PENNSYLVANIA, A CORPORATION OF PENNSYLVANIA.

BATTERY PLATE AND PROCESS OF MAKING SAME.

No Drawing.   Application filed February 1, 1922.   Serial No. 533,465.

*To all whom it may concern:*

Be it known that I, WALTER E. HOLLAND, a citizen of the United States, residing in Philadelphia, Pennsylvania, have invented Battery Plates and Processes of Making Same, of which the following is a specification.

The chief objects of this invention are: to provide an improved method of pasting, finishing and drying electric battery plates; to provide an electric battery plate of improved structure, whereby it shall be capable of being formed and charged at comparatively high current rates without dislodgement of flakes or scales of active material, and which shall have better service characteristics when used in a battery; and to provide unformed, pasted electric battery plates of improved mechanical strength and of such character that they can be handled, stored, shipped and assembled into cells and subsequently formed, in place in the cells, without injury.

Other objects and advantages will appear as the description proceeds.

When an active material paste made up of fine particles of a metallic oxide and water or a water solution is applied to a battery plate grid and subsequently dried in air in the ordinary manner, the paste solidifies and hardens and in so doing shrinks or tends to shrink. This causes minute fissures or cracks to appear along the grid members and usually throughout the body of the pasted material, the number and size of the cracks depending on the character and kind of metallic oxide used, the make-up of the paste, the conditions of drying, and other factors. Such cracks not only weaken the structure of the active material and impair its conductivity and contact with the grid members, but they also cause uneven working of the plate due to the excess of electrolyte supplied by means of each crack to the immediately-adjacent active material. Such uneven working tends to cause premature disintegration of the active material, owing to undermining by the early softening of the material adjacent the cracks, while the diminished conductivity and mechanical strength make rapid formation and charging of the plate unsafe or impossible.

By my invention I am able to make battery plates of improved structure, practically free of cracks, and having better service characteristics, from oxides the use of which has been found impractical heretofore.

In carrying out my invention I place the plate grid to be pasted or filled with active material upon a sheet of absorbent material such as unsized paper, supported upon a flat surface. The lead oxide or other active material, previously mixed to a paste with dilute sulphuric acid or other suitable solution, is then applied and forced into all the recesses of the grid by means of a paddle or other suitable instrument, after which the top surface of the plate is leveled or smoothed off and a second sheet of paper is applied thereto and smoothed with the hand or lightly rolled, causing it to adhere to the wet active material. The plate is thereupon turned over so that it rests upon the second sheet of paper. The first paper sheet is then removed and active material paste is added as required to finish the filling and to smooth off the then upper surface of the plate, after which either the original sheet of paper or a third sheet is applied to it, in such a way as to cause it to make intimate, adherent contact with the face of the wet plate, which is preferably done by rolling.

The plate with the sheets of paper on its two flat faces is then subjected to any desired or suitable drying treatment, such as exposing it to the action of air or other gas, under such conditions as to temperature, pressure, humidity and velocity as may be determined upon, or such as subjecting it to a suitable steam treatment. In any case the treatment is to be such that the active material paste is partly or wholly deprived of water and caused to solidify or set.

After the drying has been carried to the desired point or has been completed, the paper sheets will fall off of, or may be easily removed from, the faces of the plate, after which the plate may be given any additional drying or aging treatment that may be thought desirable, for the further hardening of the active material, or for other purposes.

On examination it is found that plates treated in accordance with the above method have far less shrinkage cracks than similarly-pasted plates dried in the usual way with the surfaces exposed. With some kinds of active material paste, the cracking may be entirely eliminated and in all cases the strength and physical structure of the plate are improved considerably so that the tendency of the material to break up and scale off is minimized. In consequence of the improved structure, together with the improvement in electrical conductivity and contact within the plate, it is possible to speed up the formation of such plates by the use of high charging rates or, if desired, to form the plates after assembling into cells.

Moreover, the formed plates or cells made in accordance with this invention have more uniform capacity and better service life, owing to the evenly distributed porosity and the improved structure, while at the same time, the practical range of metallic oxides for battery use is greatly extended.

While I preferably use sheets of more or less absorptive paper in carrying out my invention, I may, if desired, employ sheets of other absorptive materials such as woven fabric, or thin sheets or plates of asbestos or wood, or any absorbent powder or other suitable material which, when applied to the plate surfaces, will properly regulate the rate and manner of evaporation or withdrawal of liquid from the active material of a battery plate during the drying or setting of said material.

I claim:

1. The method which consists in applying absorptive material to the faces of a pasted battery plate and thereafter subjecting said plate to a drying treatment.

2. The step in the manufacture of a battery plate which consists in causing paper sheets to adhere to the faces of a moist battery plate to regulate the drying thereof.

3. The process which consists in applying liquid-containing active material to a plate grid; applying sheets of liquid-absorbing material to the exposed faces of the active material in said grid; and thereafter subjecting the plate to a liquid-removing treatment.

4. The process which consists in applying active material paste to a plate grid; placing sheets of paper upon the exposed faces of the paster plate; and thereafter subjecting the plate to a drying treatment.

5. The process which consists in applying active material paste to a plate grid; placing a sheet of water-absorptive material upon the upper face of the plate; finishing the opposite face of the plate; applying a second absorptive sheet to said second face; and subjecting the plate and the sheets to a drying operation.

6. The process which consists in applying active material paste to a plate grid; causing a water-absorptive material to adhere to the faces of the resulting plate; and thereafter exposing the plate to the drying action of a gas.

7. The process which consists in applying active material paste to a plate grid; causing sheets of water-absorptive material to adhere to the faces of the resulting plate; and thereafter exposing the plate to the drying action of a heated gas.

8. The process which consists in applying active material paste to a plate grid; causing a water-absorptive material to adhere to the faces of the resulting plate; and thereafter exposing the plate to the action of steam.

WALTER E. HOLLAND.